United States Patent [19]

Ishitobi

[11] Patent Number: 4,734,723

[45] Date of Patent: Mar. 29, 1988

[54] ELECTROPHOTOGRAHIC PRINTER

[75] Inventor: Yoshimitsu Ishitobi, Osaka, Japan

[73] Assignee: NEC Home Electronics Ltd., Osaka, Japan

[21] Appl. No.: 874,850

[22] Filed: Jun. 16, 1986

[30] Foreign Application Priority Data

Jun. 14, 1985 [JP] Japan ................................ 60-129432

[51] Int. Cl.[4] ........................ G01D 15/06; G01D 15/10

[52] U.S. Cl. ................................. 346/160; 346/153.1; 355/3 R

[58] Field of Search .......................... 355/1, 3 R, 14 E; 313/506, 509; 362/84; 346/153.1, 160

[56] References Cited

U.S. PATENT DOCUMENTS 3,806,759 4/1974 Kabaservice et al. .............. 313/506
4,006,383 2/1977 Luo et al. ........................ 313/509 X
4,435,064 3/1984 Tsukada et al. ......................... 355/1
4,535,341 8/1985 Kun et al. ........................ 313/509 X
4,549,784 10/1985 Inokuchi ............................ 355/1 X
4,557,581 12/1985 Woolley et al. ......................... 355/1
4,617,195 10/1986 Mental ........................... 313/506 X

*Primary Examiner*—Fred L. Braun
*Attorney, Agent, or Firm*—Cushman, Darby & Cushman

[57] ABSTRACT

An electrophotographic printer which is equipped with a photoreceptor, a charge device, an optical head, a developing device and a transfer device. The optical head has an array of electroluminescent devices arranged along one edge of a substrate and an array of light waveguide strips for transmitting the light from each of the electroluminescent devices to the other edge of the substrate which is to be brought into a face-to-face relationship with the photoreceptor.

8 Claims, 4 Drawing Figures

ELECTROPHOTOGRAHIC PRINTER

BACKGROUND OF THE INVENTION

The present invention relates to an electrophotographic printer by which information in the form of electrical signals is recorded permanently on a recording medium such as paper.

Electrical signals can be converted to light of varying intensities and an image pattern according to these different light intensities can be recorded on a recording medium such as paper. This principle is employed in the electrophotographic printer the use of which is increasing today.

In the electrophotographic printer, the surface of a photoreceptor coated on a rotating drum accepts and holds a uniform electrostatic charge and, after the uniformly charged surface is illuminated by light from an optical head, the charged image is developed by attracting toner particles. The amount of toner attraction varies with the intensity of light from the optical head and an image pattern according to the difference in the toner density is formed on the surface of the photoreceptor. Electrophotographic printing is completed by transferring this image pattern onto a recording medium such as paper.

The optical heads so far developed for use with electrophotographic printers include a laser scanner, an array of light-emitting diodes, and the combination of a light source and a liquid-crystal shutter cell.

For more details of the electrophotographic printer, see a review entitled "Rapid Expansion of the Market of Desktop Electrophotographic Printers Capable of Document and Simple Video Printouts" in Nikkei Electronics, No. 366, Apr. 8, 1985.

The optical heads used in the prior art electrophotographic printers have various disadvantages. The laser scanner requires the use of a costly scanning mechanism the key component of which is a rotating polygonal mirror. The optical head using an array of light-emitting diodes has the disadvantage of low production rate of LED array. The optical head using a liquid-crystal shutter cell in combination with a light source is unable to attain high printing speeds and has the additional disadvantage of requiring the temperature control of both the liquid-crystal shutter and a fluorescent lamp used as the light source.

SUMMARY OF THE INVENTION

The present inventors made various studies in order to solve the aforementioned problems of the prior art optical heads for use with an electrophotographic printer and have come up with an electrophotographic printer which is equipped with a photoreceptor, a charging device, an optical head, a developing device and a transfer device, the optical head having an array of electroluminescent devices arranged along one edge of a substrate and an array of light waveguide strips for transmitting the light from each of the electroluminescent devices to the other edge of said substrate which is to be brought into a face-to-face relationship with said photoreceptor.

DETAILED DESCRIPTION OF THE INVENTION

Figure 2:
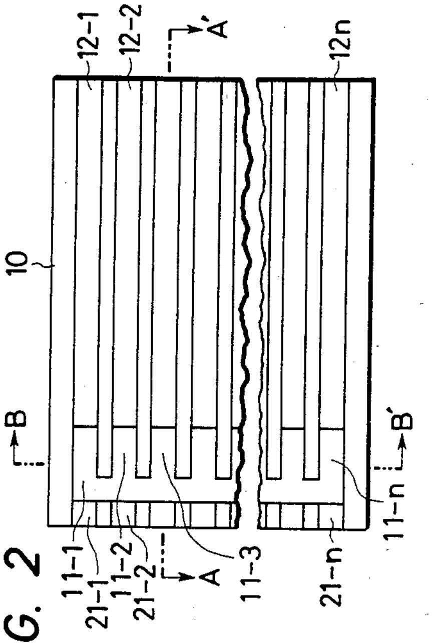
FIG. 2 is a plan view of the optical head shown in FIG. 1.

The action of the mechanism of the electrophotographic printer of the present invention will be hereunder described in detail with reference to the embodiment shown in the drawings.

Figure 1:
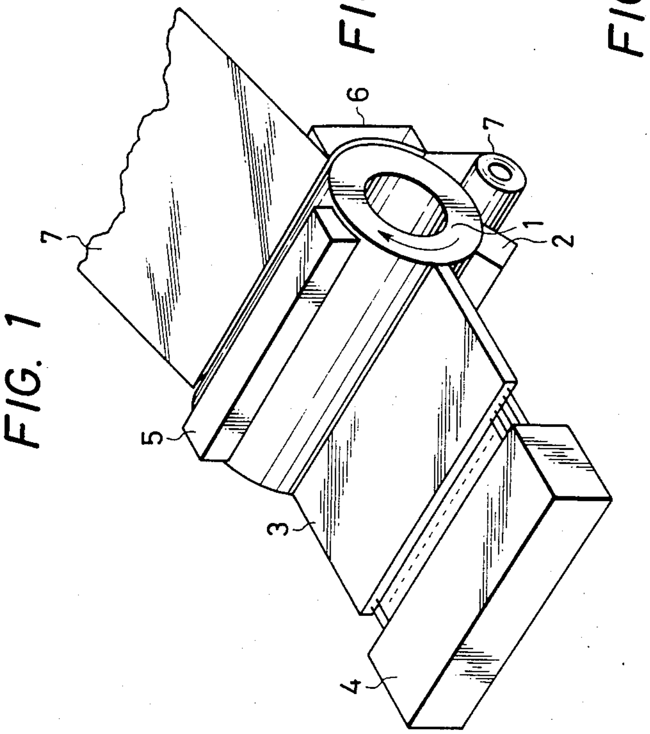
FIG. 1 is a perspective view showing the principal components of an electrophotographic printer according to one embodiment of the present invention.

FIG. 1 is a perspective view showing the principal components of the electrophotographic printer according to one embodiment of the present invention. As shown, the printer is equipped with a photoreceptor 1 coated on a rotating drum; a charging device 2; an optical head 3, an optical head drive 4; a developing device 5; and a transfer device 6, and allows patterned images such as in documents and simple video images to be printed on a sheet of recording paper 7. For the sake of clarity, accessories such as an erasure device, a fixing device, a cleaning device and a paper feed device and the support mechanisms conventionally used for these accessories are eliminated from FIG. 1.

A layer of photoconductive material is formed on the surface of the photoreceptor 1 which is caused to rotate at a constant speed in the clockwise direction indicated by the arrow.

As the photoreceptor 1 passes over the charging device 2, it is uniformly electrified with electrostatic charges which build up on the photoreceptor surface in its axial direction as a result of corona discharge.

The uniformly charged surface of the photoreceptor 1 is illuminated under the optical head 3 which issues different quantities of light from an array of light waveguides spaced at given intervals in the axial direction of the photoreceptor. The charge on the photoreceptor surface is lost when it is exposed to light but the degree of charge loss depends on the amount of exposure and a charge pattern is formed according to the density of residual charges which varies in the axial direction of the photoreceptor 1.

The optical head drive 4 supplies an electrical signal to each of the electroluminescent (EL) devices which are formed in association with the respective light waveguides in the optical head 3.

After the formation of the density pattern of residual charges at the optical head 3, the photoreceptor 1 passes under the developing device 5 and a density pattern is formed according to the amount of the toner which is attracted by the residual charges held on the photoreceptor surface in varying quantities.

This toner density pattern is then transferred onto the sheet of recording paper 7 under an electric field applied from the transfer device 6.

Figure 3:
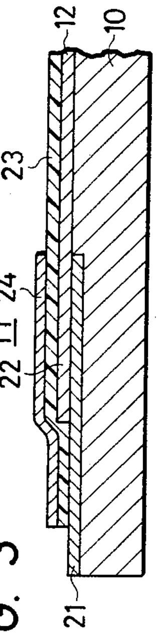
FIG. 3 is a partial cross section of FIG. 2 taken on line A–A'.

FIG. 2 is a plan view of the optical head 3 shown in FIG. 1. FIG. 3 is a partial cross section of FIG. 2 taken on line A–A', and FIG. 4 is a partial cross section of FIG. 2 taken on line B–B'.

A plurality of EL devices 11-1, 11-2, 11-3, . . . 11-n are formed along one edge of a substrate 10 which is typically made of glass. A plurality of light waveguide strips 12-1, 12-2, 12-3, . . . 12-n are also formed on the substrate 10 in association with the respective EL devices and they serve to transmit the light from the EL devices to the other edge of the substrate 10 which is to be brought into a face-to-face relationship with the photoreceptor 1.

Figure 4:
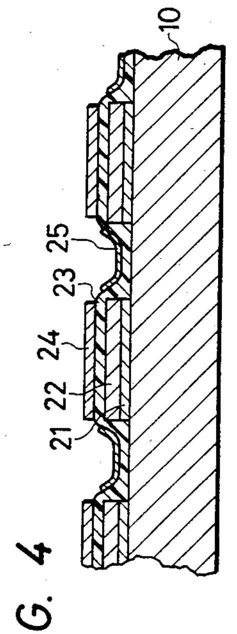
FIG. 4 is a partial cross section of FIG. 2 taken on line B–B'.

As shown in cross section in FIGS. 3 and 4, each of the EL devices 11 comprises a metal lower electrode layer 21, an EL material layer 22, an electrical insulating layer 23, and a metal upper electrode layer 24, which are formed in sequence on the substrate 10. In an embodiment of the invention, the metal lower electrode layers 21 and 24 are composed of Al, the EL material layer 22 is made of ZnS:Mn, and the electrical insulating layer 23 is composed of $SiO_2$. However, they are not limited to the above materials.

The upper electrode layers 24 are interconnected on one edge (the left end in FIG. 3) of the substrate 10 to form a common electrode. The lower electrode layers 21 are supplied with an electrical signal of varying amplitude from the optical head drive 4 (FIG. 1) to cause the associated EL devices 11 to produce different quantities of light.

The EL material layer 22 which serves as the active portion of each EL device 11 extends in the form of an uninterrupted strip to the other edge of the substrate 10, forming a light waveguide 12 which transmits the light from the EL device to the other edge of the substrate 10. The ZnS:Mn of which the layer 22 is made has high conversion efficiency and helps provide a high-efficiency light waveguide having a high refractive index.

As shown in cross section in FIG. 4, the electrical insulating layer 23 which covers an individual EL device and light waveguide is overlaid with a metal light-shielding layer 25 such as Al which prevents interference by light leakage from adjacent EL devices and light waveguides so that sharply defined patterns are obtained by electrophotographic printing.

Two adjacent light waveguides are typically spaced by a distance of about 100 microns, so, the optical head 3 used in the printer of the present invention can be fabricated easily and with good yield by applying any of the standard forming techniques, such as vacuum evaporation, sputtering and photolithography, to the materials described above.

In the embodiment described above, each of the EL devices and associated light waveguides has the same transversal width. It should however be noted that in order to produce an increased amount of light, the active portion of each EL device may be formed in a greater breadth than the associated light waveguide which is tapered toward the other end of the substrate.

As will be apparent from the foregoing description, the electrophotographic printer of the present invention which uses an array of EL devices in the optical head has the following advantages: it obviates the need for a costly scanning mechanism which is essential to the laser scanning method; the array of EL devices can be fabricated with a higher yield than the conventional array of light-emitting diodes; it attains a higher printing speed than the printer using a liquid-crystal shutter cell and eliminates the need for close temperature control.

What is claimed is:

1. An electrophotographic printer comprising:
a photoreceptor;
a charging device positioned adjacent said photoreceptor for charging the same;
a developing device positioned adjacent said photoreceptor for forming a toner density pattern on a charged area thereof;
a transfer device positioned adjacent said photoreceptor for transferring a toner image therefrom onto a sheet of paper;
an optical head, positioned adjacent said photoreceptor and including a substrate;
a light-emitting means for emitting light arranged along one edge portion of the substrate, said light-emitting means comprising an array of electro-luminescent devices, said electro-luminescent devices comprising a first metal electrode layer formed on said substrate, an electro-luminescent material layer formed on said first electrode layer, an electrical insulating layer formed on said electro-luminescent material layer, and a second metal electrode layer formed on said electrical insulating layer; and
a light transmitting means for transmitting light emitted from said emitting means to said photoreceptor; said transmitting means comprising an array of light wave guide strips.

2. An electrophotographic printer as claimed in claim 1 further comprising:
an optical head drive, said optical head drive supplying an electrical signal of varying amplitude to each of said first electrode layers to cause said electrolumimescent devices to produce different quantities of light.

3. An electrophotographic printer as claimed in claim 2, wherein said electroluminescent material layer extends in the form of an uninterrupted strip to the other edge portion of said substrate, forming said light waveguide.

4. An electrophotographic printer as claimed in claim 3, wherein said second electrode layer are interconnected on said one edge of said substrate to form a common electrode.

5. An electrophotographic printer as claimed in claim 4, wherein said electrical insulating layer between adjacent strips formed by said electrluminescent devices and said light waveguide strips is overlaid with a metal light-shielding layer.

6. An electrophotographic printer as claimed in claim 5, wherein said first and second metal electrode layers are composed of Al.

7. An electrophotographic printer as claimed in claim 6, wherein said electroluminescent material layer is composed of ZnS:Mm.

8. An electrophotographic printer as claimed in claim 5, wherein said electroluminescent material layer is composed of ZnS:Mn.

* * * * *